(12) United States Patent
Kim

(10) Patent No.: US 7,525,757 B2
(45) Date of Patent: Apr. 28, 2009

(54) ANTI-SHOCK DEVICE FOR VEHICULAR HARD DISK DRIVE AND ASSEMBLY METHOD THEREOF

(75) Inventor: Jong Sik Kim, Icheon-shi (KR)

(73) Assignee: Hyundai Autonet Co., Ltd., Icheon-Shi Kyungki-Do (KR)

( * ) Notice: Subject to any disclaimer, the term of this patent is extended or adjusted under 35 U.S.C. 154(b) by 382 days.

(21) Appl. No.: 11/424,863

(22) Filed: Jun. 17, 2006

(65) Prior Publication Data

US 2007/0025014 A1 Feb. 1, 2007

(30) Foreign Application Priority Data

Jul. 26, 2005 (KR) .................. 10-2005-0067620

(51) Int. Cl.
*G11B 17/00* (2006.01)
(52) U.S. Cl. .................................... 360/97.01
(58) Field of Classification Search ............. 720/651, 720/693; 369/44.11, 263; 361/685; 248/27.1; 206/683; 188/267.2; 360/97.01
See application file for complete search history.

(56) References Cited

U.S. PATENT DOCUMENTS

| | | | | |
|---|---|---|---|---|
| 5,864,533 | A * | 1/1999 | Yamada et al. | 720/693 |
| 6,219,315 | B1 * | 4/2001 | Buchs et al. | 369/44.11 |
| 6,249,432 | B1 * | 6/2001 | Gamble et al. | 361/685 |
| 6,477,042 | B1 * | 11/2002 | Allgeyer et al. | 361/685 |
| 6,603,728 | B1 * | 8/2003 | Hopf et al. | 720/651 |
| 6,934,959 | B2 * | 8/2005 | Takizawa et al. | 720/651 |
| 2003/0112735 | A1 * | 6/2003 | Itakura | 369/263 |
| 2004/0129515 | A1 * | 7/2004 | Murakami | 188/267.2 |
| 2005/0121354 | A1 * | 6/2005 | Gillis et al. | 206/583 |
| 2005/0207321 | A1 * | 9/2005 | Song | 369/247.1 |
| 2005/0230567 | A1 * | 10/2005 | Kumeda et al. | 248/27.1 |

FOREIGN PATENT DOCUMENTS

| | | |
|---|---|---|
| JP | 57-205857 | 12/1982 |
| JP | 60-085040 | 5/1985 |
| JP | 60-157736 | 8/1985 |
| JP | 61-080553 | 4/1986 |
| JP | 02-220261 | 9/1990 |
| JP | 05-205388 | 8/1993 |
| JP | 07-147083 | 6/1995 |
| JP | 2001-294004 | 10/2001 |
| KR | 20-2000-0002266 | 2/2000 |
| KR | 1020050012305 | 2/2005 |

* cited by examiner

*Primary Examiner*—Tianjie Chen
(74) *Attorney, Agent, or Firm*—IPLA P.A.; James E. Bame

(57) ABSTRACT

An anti-shock device for a vehicular HDD (hard disk drive) and an assembly method thereof are provided. The device includes: the HDD being a storage medium; a HDD bracket coupled and fixed at its bottom surface with the HDD; a plurality of silicone dampers being damping members for damping an outside vibration shock transmitted to the HDD; a plurality of damper housings for coupling and fixing the silicone dampers to their circumferential surfaces, and preventing free movements of the silicone dampers; a HDD connector for connecting the HDD to the vehicular electronic equipment; and an anti-shock bracket divided and coupled as an upper anti-shock bracket and a lower anti-shock bracket with each other, and supporting the silicone damper and the damper housing.

5 Claims, 4 Drawing Sheets

ANTI-SHOCK DEVICE FOR VEHICULAR HARD DISK DRIVE AND ASSEMBLY METHOD THEREOF

BACKGROUND OF THE INVENTION

1. Field of the Invention

The present invention relates to a vehicular storage device, and more particularly, to an anti-shock device for a vehicular hard disc drive (HDD), for minimizing vibration applied to the HDD being a large capacity of storage device so that the HDD can be employed in a vehicle generating much vibration, and an assembly method thereof.

2. Description of the Related Art

Together with car automation and electronification, in recent years, a car is equipped with various electronic equipments such as an automatic personal computer, a car audio/video, a navigation system, a telematics system, and a MPEG-1 Audio Layer 3 (MP3) player. According to upgrading of and association between the electronic equipments, a gradually larger capacity of vehicular storage device is being required.

As the conventional vehicular storage device, a memory such as a random access memory (RAM) and a read only memory (ROM) generally installed within the electronic equipment, or a flash memory connected to the exterior of an electronic device has been used. However, the conventional memory has a drawback in that it is difficult to satisfy a storage capacity required for the respective electronic equipments, and a unit price per storage capacity is expensive.

Accordingly, it is a recent trend that the hard disk drive (HDD) being the large capacity of storage device is gradually used for the vehicular electronic equipment.

However, it is not designed to endure a vibration generated from the car with only the single-part HDD itself. Therefore, a separate HDD anti-shock method is being required. However, it is an initial stage of applying the HDD to the car without an anti-shock structure for the HDD. As shown in FIG. 1, in the conventional art, the HDD is firmly fixed and coupled to a HDD bracket using a screw and then, its resultant assembly is installed within the vehicular electronic equipment. Therefore, a vibration shock transmitted to the vehicular electronic equipment depending on a car driving state such as a sudden acceleration, a sudden stop, or driving on an unpaved road is transmitted to the HDD as it is through the HDD bracket, thereby causing an erroneous operation and a damage of the HDD.

SUMMARY OF THE INVENTION

Accordingly, the present invention is directed to an anti-shock for a vehicular hard disc drive and an assembly method thereof that substantially overcome one or more of the limitations and disadvantages of the conventional art.

One object of the present invention is to provide an anti-shock for a vehicular hard disc drive, in which an anti-shock structure using a damper is applied to a HDD to minimize vibration applied to the HDD from the exterior, thereby preventing an erroneous operation and a damage of the HDD, and an assembly method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided an anti-shock device for a vehicular HDD (hard disk drive), for absorbing a shock from the HDD installed in a vehicular electronic equipment, the device including: the HDD being a storage medium; a HDD bracket coupled and fixed at its bottom surface with the HDD; a plurality of silicone dampers being damping members for damping an outside vibration shock transmitted to the HDD; a plurality of damper housings for coupling and fixing the silicone dampers to their circumferential surfaces, and preventing free movements of the silicone dampers; a HDD connector for connecting the HDD to the vehicular electronic equipment; and an anti-shock bracket divided and coupled as an upper anti-shock bracket and a lower anti-shock bracket with each other, and supporting the silicone damper and the damper housing.

In another aspect of the present invention, there is provided an assembly method of an anti-shock device for a vehicular HDD (hard disk drive), for absorbing a shock from the HDD installed in a vehicular electronic equipment, the method including the steps of: coupling the HDD with a bottom surface of a HDD bracket using a screw; fitting and coupling a silicone damper with a circumferential surface of a damper housing, and then coupling the resultant assembly with the HDD bracket using a screw; coupling a HDD connector with the HDD bracket using a screw; fitting and coupling the resultant assembly part with a lower anti-shock bracket; fitting and coupling the upper anti-shock bracket with the lower anti-shock bracket using a screw; and installing the resultant assembled HDD anti-shock device within the vehicular electronic equipment.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
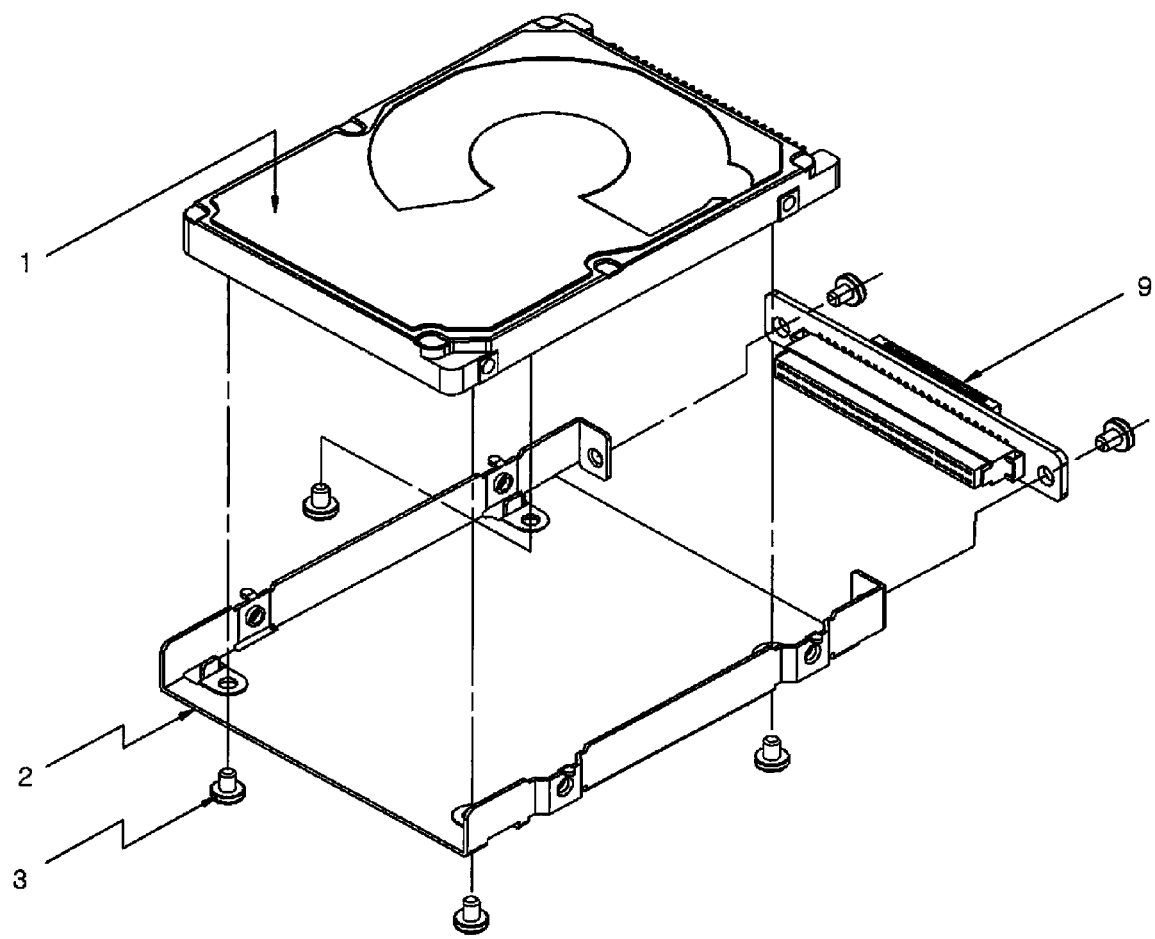
FIG. 1 is a perspective view illustrating a conventional assembled vehicular HDD.

Reference will now be made in detail to the preferred embodiments of the present invention, examples of which are illustrated in the accompanying drawings. Wherever possible, the same reference numerals will be used throughout the drawings to refer to the same or like parts.

Figure 2:
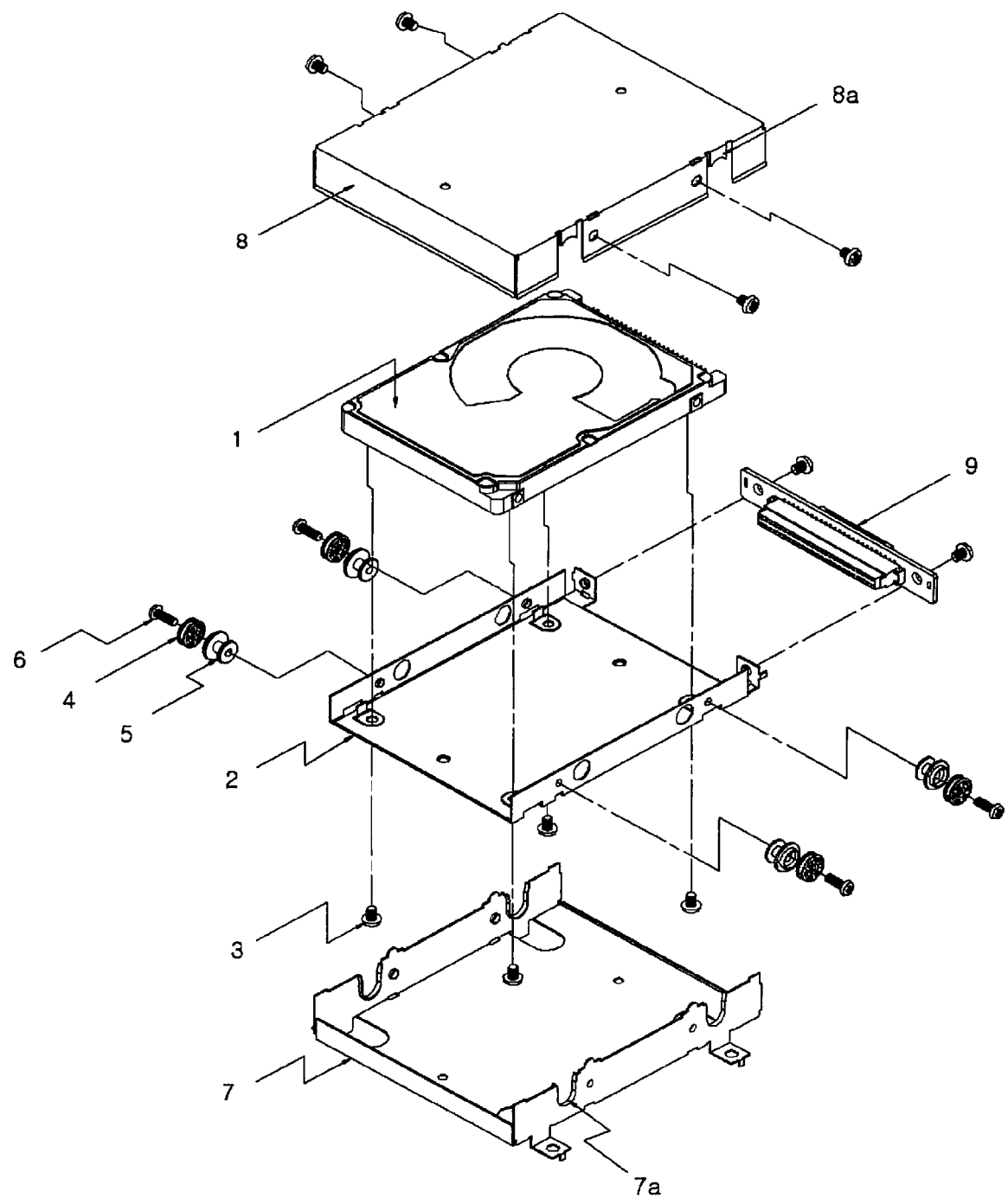
FIG. 2 is an exploded perspective view illustrating a construction of an anti-shock device for a vehicular hard disk drive (HDD) according to an embodiment of the present invention.
Figure 3:
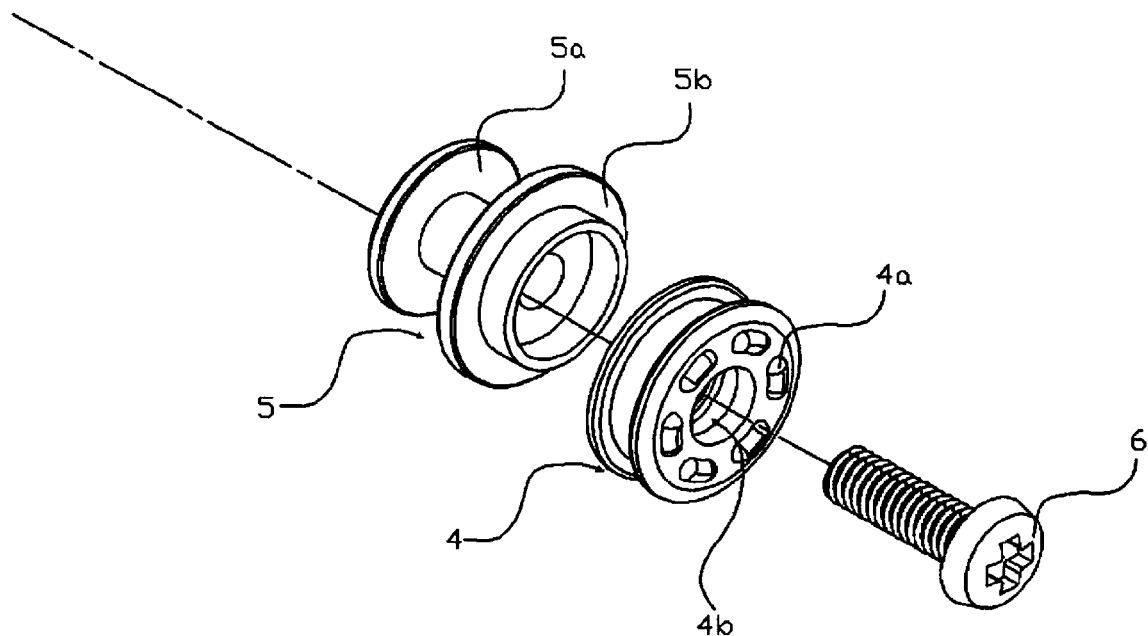
FIG. 3 is an exploded perspective view illustrating a main part of FIG. 2.
Figure 4:
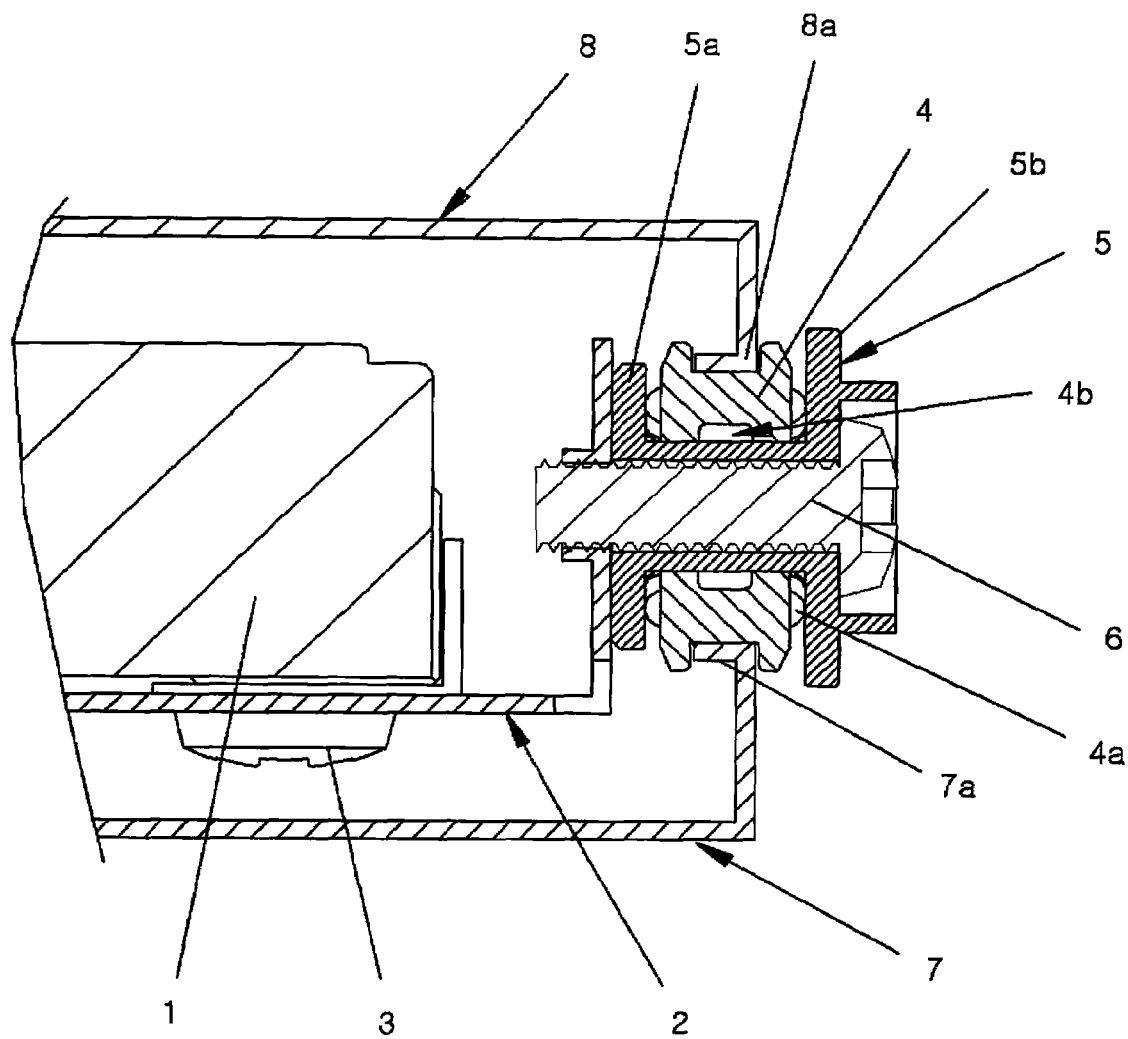
FIG. 4 is a partial and detailed sectional view illustrating an assembled state of an anti-shock device for a vehicular HDD according to an embodiment of the present invention.

FIG. 2 is an exploded perspective view illustrating a construction of the anti-shock device for the vehicular hard disk drive (HDD) according to an embodiment of the present invention, FIG. 3 is an exploded perspective view illustrating a main part of FIG. 2, and FIG. 4 is a partial and detailed sectional view illustrating an assembled state of the anti-shock device for the vehicular HDD according to an embodiment of the present invention.

The inventive anti-shock device includes the HDD 1 being a storage medium; a HDD bracket 2 coupled and fixed at a bottom surface to the HDD 1; a plurality of silicone dampers 4 being damping members for damping an outside vibration shock transmitted to the HDD 1; a plurality of damper housings 5 for coupling and fixing the silicone dampers 4 to their circumferential surfaces, and preventing free movements of the silicone dampers 4; a HDD connector 9 for connecting the HDD 1 to the vehicular electronic equipment; and an anti-shock bracket divided and coupled as an upper anti-shock bracket 8 and a lower anti-shock bracket 7 with each other, and supporting the silicone damper 4 and the damper housing 5.

In particular, in an anti-shock structure of the anti-shock device for the vehicular HDD according to the present invention, as shown in FIGS. 2 to 4, its operation is based on a principle of damping the outside vibration shock transmitted to the HDD 1 using the damping member comprised of the silicone damper 4. The silicone damper 4 is designed to have a plurality of protrusions 4a formed at its external left and right surfaces and have a groove 4b as much as a predetermined space provided therein such that, when the outside vibration shock is applied, the shock transmitted to the HDD 1 is well absorbed even in a minimal space.

Further, the damper housing 5 axially fitted and coupled with the silicone damper 4 has flanges 5a and 5b at its left and right ends, for preventing the silicone damper 4 from freely moving to the left and right.

In the inventive anti-shock device, a through-hole is provided to have a size as much as a passage of a screw 8 within the damper housing 5 so that the silicone damper 4 and the damper housing 5 can be coupled to the HDD bracket 2 with a minimal part.

The upper anti-shock bracket 8 and the lower anti-shock bracket 7 have a plurality of fixing fragments 8a and fixing grooves 7a at their both-sided wall surfaces, respectively, to fix the silicone dampers 4 upward and downward.

A detailed process of assembling the inventive anti-shock device for the vehicular HDD will be described below.

First, after the HDD 1 is coupled to the bottom surface of the HDD bracket 2 using a screw 3, the silicone damper 4 is fitted and coupled to the circumferential surface of the damper housing 5 and then is coupled to the HDD bracket 2 using the screw 6.

After that, the HDD connector 9 is coupled to the HDD bracket 2 using a screw, and its resultant assembly part is fitted and coupled to the lower anti-shock bracket 7. At this time, an assembly of the damper housing 5 and the silicone damper 4 is fitted and coupled into the fixing groove 7a of the lower anti-shock bracket 7.

Next, the upper anti-shock bracket 8 is fitted to the lower anti-shock bracket 7. At this time, the fixing fragment 8a of the upper anti-shock bracket 8 is fitted to the fixing groove 7a of the lower anti-shock bracket 7 and then, the upper anti-shock bracket 8 and the lower anti-shock bracket 7 are coupled using a screw.

At this time, the silicone damper 4 is fitted and fixed between the fixing fragment 8a and the fixing groove 7a, and then the resultant assembled HDD anti-shock device is completely installed within the vehicular electronic equipment.

Accordingly, in the assembled anti-shock device for the vehicular HDD, if the vibration shock occurring at the time of driving the car is transmitted up to the upper and lower anti-shock brackets 8 and 7 through the vehicular electronic equipment, the silicone damper 4 almost damps and minimizes the vibration shock transmitted to the HDD bracket 2, thereby preventing an erroneous operation and a damage of the single-part HDD fixed and coupled to the HDD bracket 2.

In other words, if the car is up and down vibrated and shocked in a sudden manner due to a speed stopper or an unpaved road at the time of driving, the vibration shock is transmitted as it is and the upper and lower anti-shock brackets 8 and 7 are also vibrated up and down, and the vibration shock is again transmitted to the silicone damper 4 through the fixing fragment 8a and the fixing groove 7a. At this time, the groove 4b having a size as much as a predetermined space within the silicone damper 4 absorbs almost of the up and down vibration shock from the fixing fragment 8a and the fixing groove 7a while silicone repeats contraction and expansion depending on its elastic force and elastic restoring force.

Further, if the car is vibrated and shocked to the left and right (or to the front and rear) in a sudden manner due to the sudden acceleration or the sudden stop at the time of driving, the vibration and shock is transmitted as it is and the upper and lower anti-shock brackets 8 and 7 are also vibrated to the left and right, and the vibration shock is again transmitted to the silicone damper 4 through the fixing fragment 8a and the fixing groove 7a. At this time, the plurality of protrusions 4a formed on the outer left and right surfaces of the silicone damper 4 absorb almost of the left and right vibration shock from the fixing fragment 8a and the fixing groove 7a while the silicone repeats the contraction and expansion depending on its elastic force and elastic restoring force.

As described above, the present invention has an effect of solving a drawback relating to vibration endurance difficult to be secured in the single-part HDD, thereby reducing a cost invested for solving the drawback relating to vibration endurance to apply the single-part HDD to the car, and shortening a period of time of reliability test required for applying the HDD to the car.

Further, the inventive anti-shock device is applicable as a before-market in addition to only an after-market applied all the while and therefore, can use the large capacity of HDD as an alternative of a conventional storage medium used in NAVI, compact disk (CD), tape, and changer.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. An anti-shock device for a vehicular HDD (hard disk drive), for absorbing a shock from the HDD installed in a vehicular electronic equipment, the device comprising:
   the HDD (1) being a storage medium;
   a HDD bracket (2) coupled and fixed at its bottom surface with the HDD (1);
   a plurality of silicone dampers (4) being damping members for damping an outside vibration shock transmitted to the HDD (1);
   a plurality of damper housings (5) for coupling and fixing the silicone dampers (4) to their circumferential surfaces, and preventing free movements of the silicone dampers (4);

a HDD connector (9) for connecting the HDD (1) to the vehicular electronic equipment; and an anti-shock bracket divided and coupled as an upper anti-shock bracket (8) and a lower anti-shock bracket (7) with each other, and supporting the silicone damper (4) and the damper housing (5), wherein the lower anti-shock bracket (7) has a plurality of fixing grooves (7a) at its both-sided wall surfaces, for supporting the plurality of silicone dampers (4) upward.

2. The device according to claim 1, wherein, in order to enhance a shock absorption force of the silicone damper (4), the silicone damper (4) has a plurality of protrusions (4a) formed at its external left and right surfaces, and has a groove (4b) as much as a predetermined space provided therein.

3. The device according to claim 1, wherein the damper housing (5) axially fitted and coupled with the silicone damper (4) has flanges (5a and 5b) at its left and right ends, for preventing the silicone damper (4) from freely moving to the left and right.

4. The device according to claim 1, wherein the upper anti-shock bracket (8) has a plurality of fixing fragments (8a) at its both-sided wall surfaces, for supporting the plurality of silicone dampers (4) downward.

5. An assembly method of an anti-shock device for a vehicular HDD (hard disk drive), for absorbing a shock from the HDD installed in a vehicular electronic equipment, the method comprising the steps of:

coupling the HDD (1) with a bottom surface of a HDD bracket (2) using a screw (3);

fitting and coupling a silicone damper (4) with a circumferential surface of a damper housing (5), and then coupling the resultant assembly with the HDD bracket (2) using a screw (6);

coupling a HDD connector (9) with the HDD bracket (2) using a screw;

fitting and coupling the resultant assembly part with a lower anti-shock bracket (7), wherein the lower anti-shock bracket (7) has a plurality of fixing grooves (7a) at its both-sided wall surfaces, for supporting the plurality of silicone dampers (4) upward;

fitting and coupling the upper anti-shock bracket (8) with the lower anti-shock bracket (7) using a screw; and installing the resultant assembled HDD anti-shock device within the vehicular electronic equipment.

* * * * *